United States Patent [19]

Carroll et al.

[11] 4,112,220

[45] Sep. 5, 1978

[54] NITRATE ESTERS OF GALACTOMANNAN GUMS AND METHODS FOR THEIR SYNTHESIS

[75] Inventors: William J. Carroll, Allentown; George L. Griffith, Coopersburg, both of Pa.

[73] Assignee: IMC Chemical Group, Inc., Terre Haute, Ind.

[21] Appl. No.: 518,664

[22] Filed: Oct. 29, 1974

[51] Int. Cl.$^2$ .......................... C07G 3/00; C08B 37/00
[52] U.S. Cl. ....................................... 536/18; 536/114
[58] Field of Search ................. 260/209 R, 235, 23 B; 536/114, 18

[56] References Cited

U.S. PATENT DOCUMENTS

| | | | |
|---|---|---|---|
| 2,883,376 | 4/1959 | Grageroff | 260/235 |
| 3,534,018 | 10/1970 | Brissaud et al. | 260/222 |

OTHER PUBLICATIONS

Chemical Abstracts, vol. 80, 1974, paragraph 61721j.

*Primary Examiner*—Henry R. Jiles
*Assistant Examiner*—Cary Owens
*Attorney, Agent, or Firm*—E. A. Figg; H. E. Post

[57] ABSTRACT

The present invention relates to nitrate esters of galactomannan gums and methods of making them comprising reacting a galactomannan gum with a nitrating acid. Nitrate esters of galactomannan gums are useful as thickeners and gelling agents for certain organic solvents.

9 Claims, No Drawings

NITRATE ESTERS OF GALACTOMANNAN GUMS AND METHODS FOR THEIR SYNTHESIS

BACKGROUND OF THE INVENTION

This invention relates to products which thicken or gel liquid nitroalkanes. More particularly, this invention relates to nitrate esters of galactomannan gums.

The use of polysaccharide gums as thickening agents for aqueous systems is well known. Galactomannan gums have been used extensively as thickeners and gelling agents for food products, paints, and explosive systems. Chemically, galactomannan gums are high molecular weight polysaccharides comprising mannose and galactose units bonded together through ether linkages. The molecules are generally considered to be composed of long straight chains of mannose units having side branches of galactose units. Galactomannan gums, which include guar gum and locust bean gum, are natural colloids obtained from the endosperms of leguminous seeds, such as guar, locust bean, honey locust, etc.

Although galactomannan gums have been effective thickeners for aqueous systems, they have not generally been found effective as thickeners or gelling agents for non-aqueous systems. In particular, such gums do not thicken liquid nitroalkanes. Liquid nitroalkanes, particularly nitromethane, are well known for their utility in propellants and explosives. Such propellants and explosives are advantageously thickened or gelled before use. Thickening serves several purposes including providing a better product when filled into elastic casings, providing homogeneous systems when solid ingredients such as hollow glass microspheres or ammonium nitrate prills are present, preventing leaks when contained by enclosures having small perforations, and reducing rates of evaporation of liquids from the systems.

Compounds which have been used to thicken or gel liquid nitroalkane-containing explosives include cyanoethyl ethers of galactomannan gums, nitrate esters of cellulose, and high molecular weight polyoxygethylene. Cyanoethyl ethers of galactomannan gums are described by Nordgren, Robert, U.S. Pat. No. 3,755,292 issued Aug. 28, 1973 and Jordan, W. A., U.S. Pat. No. 3,666,577 issued May 30, 1972. High molecular wieght polyoxyethylene as a thickener for liquid nitroalkanes is the subject of Jones, L. R., U.S. Pat. No. 3,318,741 issued May 9, 1967, incorporated herein by reference.

Cellulose and starch are polysaccharides which have been nitrated. Nitrated starch is used primarily as an explosive or as a thickener for aqueous systems, but it has not been found effective as a thickener for non-aqueous systems. Nitrated cellulose thickens liquid nitroalkanes; however, relatively large amounts are required to form explosive slurries. Nitrated cellulose and nitrated starch are usually prepared by reacting the respective polysaccharide with a nitrating acid. The nitrating acid is generally a mixed acid which contains a major porportion of sulfuric acid, nitric acid, and water. The nitrated products are usually purified by repeated treatments with boiling water.

SUMMARY OF THE INVENTION

It is an object of this invention to provide products which thicken or gel liquid nitroalkanes. Another object of this invention is to provide a method for producing nitrate esters of galactomannan gums. A third object of this invention is to provide thickened nitroalkane explosive compositions, and a fourth object is to provide a method of using nitrate esters of galactomannan gums. Other objects and advantages will become apparent to those skilled in the art from the disclosure herein.

In accordance with the present invention, nitrate esters of galactomannan gums are disclosed, thickened liquid nitroalkane compositions incorporating nitrate esters of galactomannan gums are disclosed, and methods of making nitrate esters of galactomannan gums comprising reacting a galactomannan gum with a nitrating acid are also disclosed.

DETAILED DESCRIPTION OF THE INVENTION

Galactomannnan gums are thought to be high molecular weight polysaccharides having linear chains of mannose units with galactose side branches. Guar gum is a galactomannan represented by the following chemical structural formula: (Stein, Hall and Co., Inc. product information booklet, JAGUAR ®Guar Gum by Stein Hall, 1968)

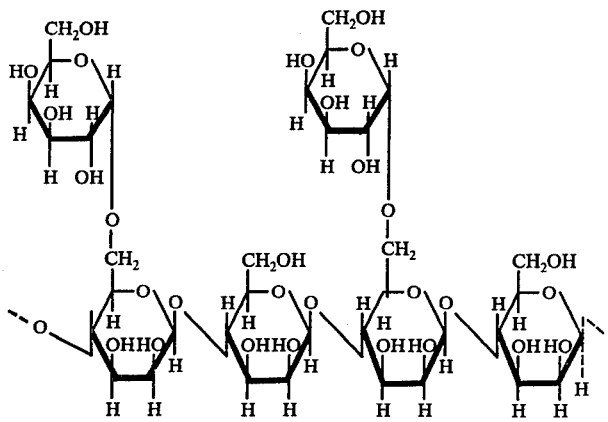

Nitrate esters of galactomannan gums are believed to have the same skeletal formulae; however, some or all, of the hydroxyl hydrogens have been replaced by nitro groups, as indicated by the following partial chemical structural formula:

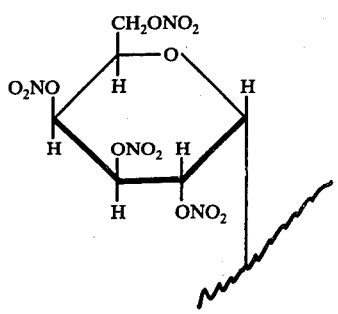

When all of the hydroxyl groups of guar gum have been nitrated, the theoretical nitrogen content is about 14.1% by weight.

Hereinafter, the degree of nitrogen substitution may be indicated by the relative nitrogen content which is the percentage of the theoretical nitrogen content which has been attained, e.g., nitrated guar gum having a nitrogen content of 7.05% by wt. has a relative nitrogen content of 50%.

In practice, the nitrogen content is usually less than theory because of incomplete nitration and impurities present in the starting materials. Nitrated products having relative nitrogen contents of about 70.0 to about 100% are satisfactory; however, most efficient thickening of organic solvents results from products having relative nitrogen contents of about 85 to about 100%.

As with other nitrated polysaccharides, nitrate esters of galactomannan gums, and particularly those containing residual amounts of acids or other impurities, are relatively hazardous materials. Appropriate safety precautions should, therefore, be observed during the preparation and use of the products. Whenever possible the products should be maintained in a water wet state.

Nitrate esters of galactomannan gums may be prepared by reacting a galactomannan gum with a nitrating acid. A nitrating acid is concentrated nitric acid or a mixture comprising concentrated nitric acid and concentrated sulfuric acid. The nitrating acid is advantageously in the form of a mixed acid medium containing concentrated nitric acid, concentrated sulfuric acid and water. A preferable nitrating acid is a mixture of about 50 to about 75% by wt. sulfuric acid and about 25 to about 50% by wt. nitric acid with less than about 5% by wt. water. The particularly preferred nitrating medium contains about 63.5% by wt. sulfuric acid, about 34.5% by wt. nitric acid, and about 2% by wt. water.

The reaction between a galactomannan gum and the nitrating acid is exothermic and is therefore preferably conducted at reduced temperatures. Acceptable results have been obtained at reaction temperatures of about −6° to about 35° C; however, the preferred temperature range for the nitration reaction is from about 5° to about 25° C.

The ratio of nitrating acid to galactomannan gum in the reaction mixture may be from about 5:1 by wt. to about 10:1. Ratios below about 5:1 generally provide unsatisfactory products, whereas, no additional advantage results from using mixtures with ratios greater than about 10:1. A preferable ratio of reactants is about 7.5:1.

The reactants are advantageously slowly combined, with agitation, so that the temperature and reaction rate may be maintained at the desired levels. The preferable manner of conducting the reaction is to place the desired quantity of nitrating acid into a suitable vessel equipped with a means for maintaining the proper temperature, and a means for agitating the mixture, followed by slowly adding the galactomannan gum to the nitrating acid mixture with agitation. The reaction is substantially completed in from about 30 minutes to about 4 hours after all of the galactomannan gum has been added.

In a preferred embodiment, a solvent selected from the group consisting of methylene chloride, 1,1,1-trichloroethane and mixtures thereof is also added to the reaction mixture. Immiscible organic solvents are frequently added to reaction mixtures in nitrating processes to solubilize the nitrated product and thereby separate it from the acid solution in which the nitration reaction occurs. This technique shifts the equilibrium of the reaction to favor the nitrated product. The function which the solvent serves in the nitration of galactomannan gums is not entirely understood. Nitrated galactomannans are substantially insoluble in the solvent, thus its function is not the same as its function would be in conventional nitration processes. The use of the solvent results in less viscous solutions, and, thus, shortens the reaction time and eliminates the need for extremely powerful agitation and it also functions to some extent as a heat sink for the system. The solvent may be added to the reaction medium in virtually any significant amount; however, satisfactory results have been obtained when approximately equal amounts of the solvent and nitrating acid mixture have been used. The preferred solvent for this technique is methylene chloride.

The use of the solvent also allows the galactomannan gum to be nitrated with concentrated nitric acid, rather than using a mixed acid. Nitration with concentrated nitric acid in the absence of a solvent as described above is precluded because the nitrated product thickens the nitric acid to the extent that agitation is prohibitively difficult. The preferred nitration technique, however, involves the use of a mixed nitrating acid and an organic solvent as described above.

After the nitration reaction has been completed, the nitrated charge is preferably drowned, that is, rapidly discharged into copious amounts of water. The charge is added to the water, rather than adding the water first, to prevent potentially hazardous localized overheating. The function of the water is to make subsequent handling safer, and to precipitate any nitrated material which has dissolved in the reaction medium. The volume of water used may be from about equal the volume of the charge to about ten times the volume of the charge, preferably about one and one-half times the volume of the charge. Volumes of water less than about equal the volume of the charge may result in dangerous overheating unless other provisions for cooling are used.

The nitrated galactomannan gum product, which usually occurs as a solid in the diluted reaction medium, may be recovered by any suitable means such as filtration or centrifugation. Mixtures containing a solvent may be filtered, or the immiscible solvent layers allowed to separate followed by separation of the solid product from the acid phase. The preferred method of recovery is, after drowning the nitrated charge, to separate the solid product by filtration. The recovered product may be washed with water until the washings are substantially neutral to litmus paper, and, to further improve the stability and quality of the product, it may be subjected to one or more boiling treatments. The boiling treatment comprises boiling the product in large quantities of water, while also subjecting it to vigorous agitation, followed by filtration. The amount of water used in this treatment is advantageously from about 1.0 to about 1.5 times the total weight of the material being purified. Amounts of water less than about 1.0 times the weight of the material are generally ineffective, whereas no additional advantage results from amounts greater than about 1.5 times the weight of the material.

The products may be used to thicken organic solvents such as acetone, and normally liquid nitroalkanes. Generally, nitrate esters of galactomannan gums effectively thicken organic solvents at levels of about 2.0 to about 12% by weight of the thickened mixture. The products, in most cases, do not form gels with organic solvents unless a crosslinker is introduced into the system. Many crosslinkers are available which cause thickened organic solvent mixtures to gel, the most appropriate being lead oxide and organic titanates such as tetrabutyl titanate, tetra-(2-ethylhexyl)titanate, tetrastearyl titanate, etc. The concentration of the crosslinker will vary with the particular crosslinker used and other ingredients present; however, the above mentioned crosslinkers are effective at concentrations of about 0.5 to about 3.0% by weight of the gelled mixture.

The products of the present invention are most useful in preparing thickened or gelled nitroalkane-based explosives. The products may be advantageously used in conjunction with other explosives such as TNT, or ammonium nitrate or with sensitizers such as hollow glass microspheres. The products are relatively inexpensive and add to the explosive power of compositions containing them, since the nitrated products are themselves high explosives.

The following examples illustrate the compositions and processes of the present invention; however, the invention is not intended to be limited thereby.

EXAMPLE I

Mixed acid (200 gm.), having the approximate composition of 63.5% by wt. sulfuric acid, 34.5% by wt. nitric acid, and 2% by wt. water, was transferred to a beaker. The mixed acid was cooled to about 5° C. and 20 grams of guar gum was slowly added to the mixture with agitation. The temperature was maintained between about 5° to about 15° C. for about 1 hour after addition was complete. The charge was drowned in an approximately equal volume of water, and the solid, nitrated product was separated from the diluted reaction mixture by filtration, washed with water and air dried. The product was determined to be nitrated guar gum.

EXAMPLE II

Mixed acid (200 gm.), having the approximate composition of 63.5% by wt. sulfuric acid, 34.5% by wt. nitric acid and 2% by wt. water, was transferred to a beaker. Methylene chloride (200 ml) was added to the acid, the mixture was cooled to approximately 0.5° C., and was stirred. Guar gum (10 grams) was slowly dispersed in the mixture with stirring over a period of about 13 minutes. The temperature was maintained between about 0° C. and about 1.5° C. as the mixture was stirred for a period of about 1 hour. The mixture was transferred to a separatory funnel, and the phases were allowed to separate. The mixture separated into two liquid layers. A thin solid layer collected at the interface. The lower methylene chloride phase was discarded. The upper acidic layer was neutralized with aqueous ammonia and filtered. The filtrate was discarded and the solid was water washed and neutralized with aqueous ammonia. After air drying it had a nitrogen content of 12.6% by wt. or a relative nitrogen content of 89.4%.

EXAMPLE III

The procedure in Example I was followed in all essential details; however, 100 gm. of mixed acid was used. The nitration proceeded satisfactorily.

EXAMPLE IV

The procedure in Example II was followed in all essential details; however, 87 gm. (50 ml) of mixed acid and 50 ml of methylene chloride were used. The nitration proceeded satisfactorily.

EXAMPLE V 500 gm. (333 ml) concentrated nitric acid (97%HNO$_3$) and 333 ml methylene chloride were placed in a beaker and cooled, with stirring, to 5° C. 50 gm. guar gum was added gradually with stirring and cooling, keeping the temperature between 5° C. and 9° C. The charge was stirred for one hour after addition was complete, drowned in 3,000 ml water, filtered, water-washed, neutralized with aqueous ammonia and dried. 61.8 gm. product was obtained.

EXAMPLE VI

The procedure of Example V was followed in all essential details, except that locust beam gum was nitrated instead of guar gum. Nitrogen content of the dried product was 12.15%.

EXAMPLE VII

The procedure of example V was followed in all essential detials, using:

| | |
|---|---|
| 400 gm. | Concentrated nitric acid (97% HNO$_3$) |
| 400 gm. | 1,1,1-trichoroethane |
| 40 gm. | Guar gum |

A solid product determined to be nitrated guar gum was obtained.

EXAMPLE VIII

Four grams of nitrated guar gum is added to 96 grams of nitromethane with stirring. A thickened solution results.

EXAMPLE IX

Four grams of nitrated guar gum is added to 96 grams of 2-nitropropane with stirring. A thickened solution results.

EXAMPLE X

The procedure of Example VIII is followed in all essential details but in addition, 1 gram of lead oxide is added to the mixture. A gelled product results.

EXAMPLE XI

The procedure of Example VIII is followed in all essential details but in addition, 1 gram of tetrabutyl titanate is added to the mixture. A gelled product results.

EXAMPLE XII

A 5% by wt. mixture of nitrated guar gum in nitromethane was prepared, which became a yellow-brown thixotropic mass. The material was loaded into a 1½ by 8 inch cartridge and was detonated using a 20 gram Pentolite booster which was initiated with a standard commercial electric blasting cap. The material detonated satisfactorily and showed relative insensitivity to friction and impact tests.

We claim:

1. A nitrate ester of a galactomannan gum in which hydroxyl hydrogens of the galactomannan gum are replaced by nitro groups.

2. The composition of claim 1 wherein said galactomannan gum is guar gum.

3. The composition of claim 1 wherein said galactomannan gum is locust bean gum.

4. The composition of claim 1 wherein said nitrate ester of a galactomannan gum has a relative nitrogen content of 70 to 100%.

5. The composition of claim 1 wherein said nitrate ester of a galactomannan gum has a relative nitrogen content of 85 to 100%.

6. A thickened nitroalkane composition consisting essentially of a nitroalkane of 1 to 3 carbon atoms and nitrated galactomannan gum in a ratio of 98 to 88 parts by wt. nitroalkane to 2 to 12 parts by wt. galactomannan gum.

7. A method of thickening a nitroalkane of 1 to 3 carbon atoms by mixing therewith from 2% by wt. to 12% by wt. of nitrated galactomannan gum.

8. A method of gelling the composition of claim 7 by adding thereto a cross-linking agent selected from the group consisting of lead oxide, tetrabutyl titanate, tetra(2-ethylhexyl)titanate, and tetrastearyl titanate.

9. The method of claim 8 wherein said cross-linking agent is tetrabutyl titanate.

* * * * *

UNITED STATES PATENT AND TRADEMARK OFFICE
CERTIFICATE OF CORRECTION

PATENT NO. : 4,112,220
DATED : September 5, 1978
INVENTOR(S) : W. J. Carroll and G. L. Griffith It is certified that error appears in the above-identified patent and that said Letters Patent are hereby corrected as shown below:

Column 1, line 58, "polyoxygethy-" should read -- polyoxyethy- --

Column 1, line 62, "wieght" should read -- weight --

Column 6, line 32, "beam" should read -- bean --

Signed and Sealed this

First Day of May 1979

[SEAL]

Attest:

RUTH C. MASON
Attesting Officer

DONALD W. BANNER
Commissioner of Patents and Trademarks